(12) United States Patent
Lee

(10) Patent No.: US 7,411,699 B2
(45) Date of Patent: Aug. 12, 2008

(54) METHOD AND APPARATUS TO ENHANCE DIGITAL IMAGE QUALITY

(75) Inventor: Jong-byun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 937 days.

(21) Appl. No.: 10/645,639

(22) Filed: Aug. 22, 2003

(65) Prior Publication Data

US 2004/0042677 A1 Mar. 4, 2004

(30) Foreign Application Priority Data

Aug. 22, 2002 (KR) .................. 10-2002-0049699
Oct. 25, 2002 (KR) .................. 10-2002-0065516

(51) Int. Cl.
*H04N 1/40* (2006.01)

(52) U.S. Cl. ........................ 358/1.9; 382/176

(58) Field of Classification Search .............. 358/1.9, 358/2.1; 382/268, 176, 189–190
See application file for complete search history.

(56) References Cited

U.S. PATENT DOCUMENTS

| | | | |
|---|---|---|---|
| 5,956,468 A | 9/1999 | Ancin | |
| 6,078,697 A * | 6/2000 | Ng | 382/275 |
| 6,175,425 B1 | 1/2001 | Khorram | |
| 6,587,115 B2 * | 7/2003 | Gong et al. | 345/596 |
| 6,625,312 B1 * | 9/2003 | Nagarajan et al. | 382/176 |
| 6,965,693 B1 * | 11/2005 | Kondo et al. | 382/190 |

* cited by examiner

*Primary Examiner*—Thomas D. Lee
*Assistant Examiner*—Stephen Brinich
(74) *Attorney, Agent, or Firm*—Stanzione & Kim, LLP

(57) ABSTRACT

A digital image quality enhancing method that enhances a quality of a document image comprising pixels with a predetermined resolution and obtained by scanning a script comprising a combination of a background, a text, and an image. The method includes: updating history information regarding color data and a pixel type of a concerned pixel using previous history information of the concerned pixel; determining a block feature type of the concerned pixel using the pixel type and the updated history information of the concerned pixel; determining a type of an area to which the concerned pixel belongs based on a second type of a second area to which a first neighboring pixel in a left direction of the concerned pixel belongs, a third type of a third area to which a second neighboring pixel in a line above the concerned pixel belongs, the pixel type of the concerned pixel, and the determined block feature type; and performing different image quality enhancing processes based on the determined area type.

42 Claims, 9 Drawing Sheets

FIG. 1 (PRIORT ART)
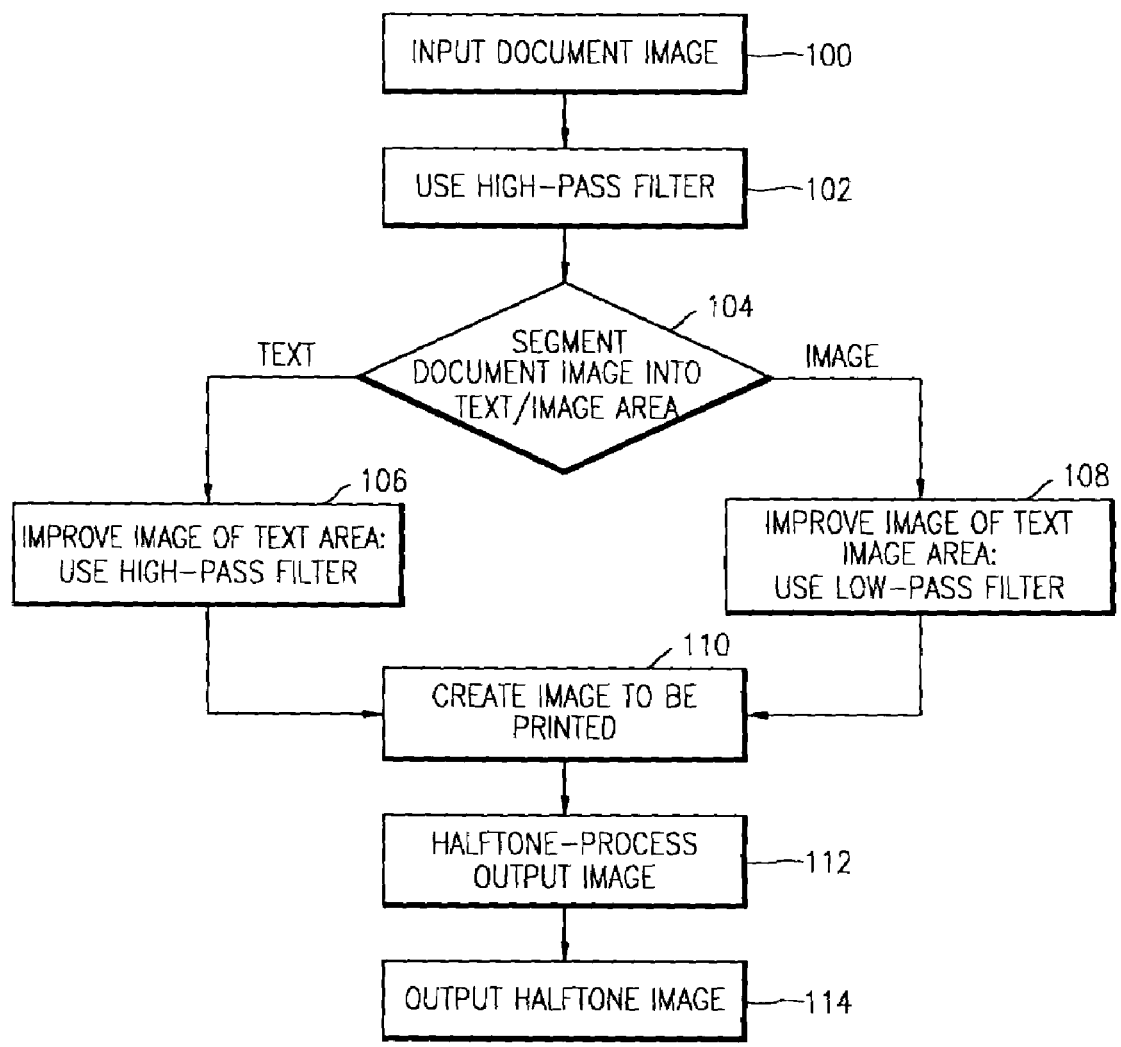

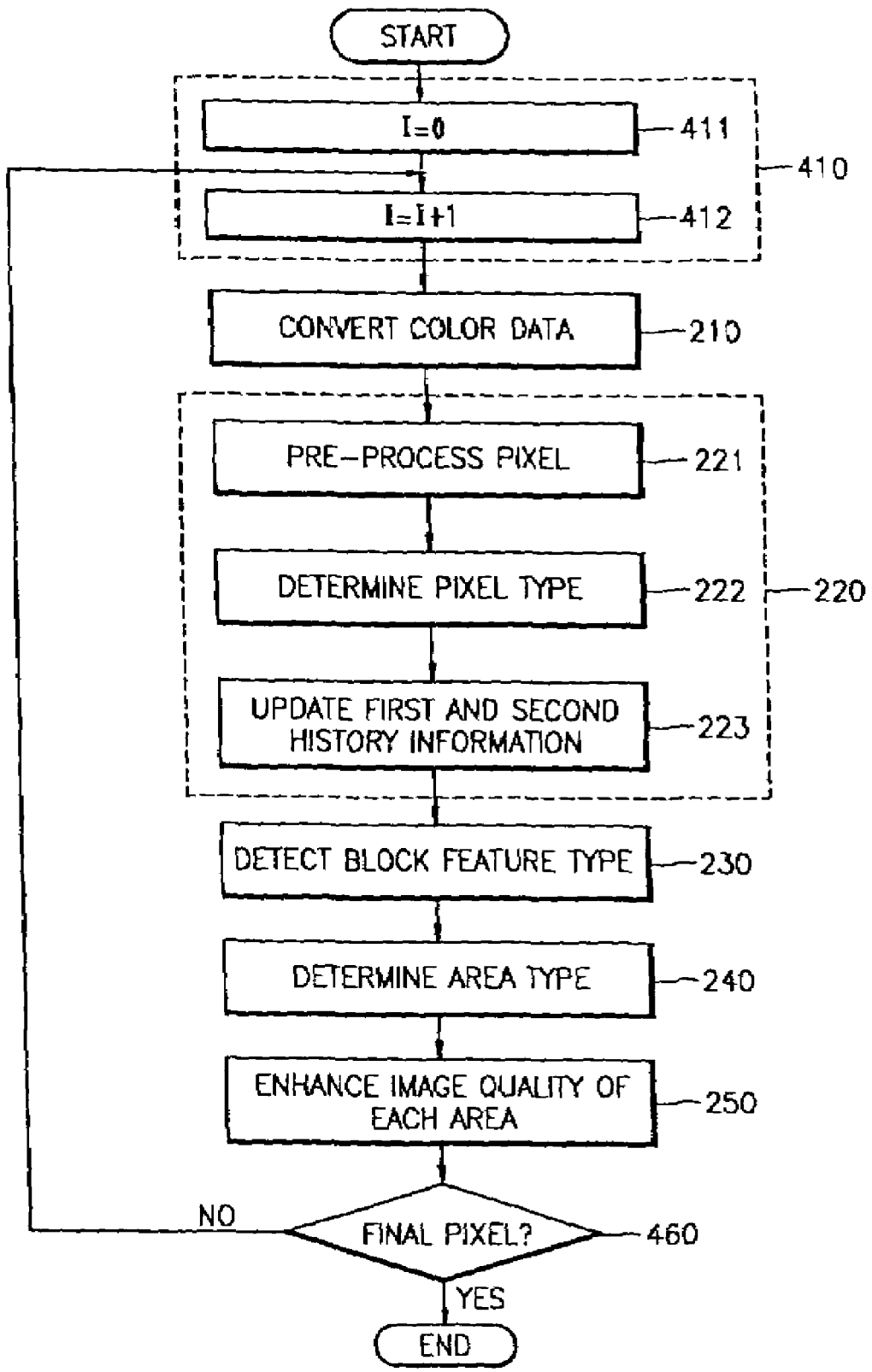

METHOD AND APPARATUS TO ENHANCE DIGITAL IMAGE QUALITY

REFERENCE TO RELATED APPLICATIONS

This application claims the priority of Korean Patent Application Nos. 2002-49699 and 2002-65516, filed on Aug. 22, 2002, and Oct. 25, 2002, respectively, in the Korean Intellectual Property Office, the disclosures of which are incorporated herein in their entireties by reference.

BACKGROUND OF THE INVENTION

1. Field of the Invention

The present invention relates to a method and apparatus to enhance digital image quality, and more particularly, to a method and apparatus to enhance digital image quality by which a document image obtained by scanning a document including a combination of a text and an image is segmented into a text area, a background area, a halftone image area, and a continuous tone image area and then an image quality of each of the areas is properly enhanced to obtain an improved image quality print.

2. Description of the Related Art

In general, interest in a technique to effectively express an original document using only black and white binary information has increased with the advancement of copying machines, facsimiles, or multi-function peripherals. The technique can be greatly classified into a dithering technique to express actual continuous brightness as pseudo brightness using the spatial black and white distribution of an image document and a bi-level segmentation technique to properly segment a text document into a text and a background to easily read the text from the text document.

However, these techniques are not effective for a document including a combination of a text and an image. In other words, in the bi-level segmentation technique, problems, such as false contours, occur in an image, and in the dithering technique, the pseudo brightness smoothes the edge of an image, which deteriorates the reading of a text portion. In order to solve these problems, a variety of studies on the enhancement of the image quality of a document including a text and an image are in progress.

FIG. 1 is a flowchart illustrating a conventional method of enhancing the image quality of a document including a combination of a text and an image, the method being disclosed in U.S. Pat. No. 6,175,425, entitled "Document Imaging System for Autodiscrimination of Text and Images," issued to Ramin Khorram on Jan. 16, 2001. Referring to FIG. 1, the method includes: receiving a multi-valued signal to represent a document image input from a scanner or another input device in operation 100, using a high-pass filter (HPF) to create a template, which defines a high contrast area in a document in operation 102, segmenting the document image into a text area and an image area in operation 104, enhancing an image in the text area by using the HPF in the text area in operation 106, enhancing an image in the image area by using a low-pass filer (LPF) in the image area in operation 108, creating an image to be printed by connecting the image in the text area to the image in the image area in operation 110, halftone-processing the image to be printed in operation 112, and printing a halftone image in operation 114.

In the above-mentioned method, an input document image is segmented into blocks, and then the HPF is used in each of the blocks to classify the blocks into the text area containing a large number of high-band components and the image area containing a small number of high-band components. Thus, if two adjacent blocks belong to different areas, one block may be blocked from the other block. Also, a block has to be very small so that all pixels in the block belong to the same area. However, as the block is small, feature extraction using frequency components becomes difficult, which results in difficulty in determining a proper size of the block.

In U.S. Pat. No. 6,078,697, entitled "Method and Apparatus for Segmenting Image Data into Contone, Text, and Halftone Classifications," issued to Yee Seung Ng on Jun. 20, 2000, windows of predetermined sizes are set around all pixels of an input document image and then gradients of pixels in a corresponding window are calculated. Fuzzy probabilities to represent the probabilities that a central pixel will belong to a text area, a halftone image area, or a continuous tone area are calculated using the sizes and directions of the calculated gradients according to Fuzzy rules. Three Fuzzy probability values are compared, an area having the greatest Fuzzy probability value is determined as a class of the central pixel, and falsely-classified pixels are reclassified to fix (determine) a class of the central pixel. In this method, since the class of the central pixel is determined using only neighboring information, many errors may be made. In addition, when adjacent pixels belong to different classes, different image quality improvement methods should be applied to the adjacent pixels. As a result, a final print may be unpleasant to a viewer's eyes.

In U.S. Pat. No. 5,956,468, entitled "Document Segmentation System" and issued to Hakan Ancin on Sep. 21, 1999, an input document image is converted into a low resolution image, wide text and image areas are found from the low resolution image, and a dark text area on a bright background is found from the remaining area of the low resolution image to perform an image quality enhancement process to enhance the readability of the dark text area. In this method, only the dark text area on the bright background is emphasized, while an image area is hardly emphasized.

SUMMARY OF THE INVENTION

The present invention provides a method of enhancing digital image quality of a document image, obtained by scanning a document including a combination of a text and an image classified into a text area, a background area, a halftone image area, and a continuous tone image area, by applying a proper image quality enhancement process to each of the areas to obtain an improved image quality print.

The present invention also provides an apparatus to perform the above described method.

According to an aspect of the present invention, there is provided a digital image quality enhancing method to improve a quality of a document image comprising pixels with a predetermined resolution and obtained by scanning a script comprising a combination of a background, a text, and an image. The method comprises: updating history information regarding color data and a pixel type of a concerned pixel using previous history information of the concerned pixel; determining a block feature type of the concerned pixel using the pixel type and the updated history information of the concerned pixel; determining a type of an area to which the concerned pixel belongs based on a second type of a second area to which a first neighboring pixel in a left direction of the concerned pixel belongs, a third type of a third area to which a second neighboring pixel in a line above the concerned pixel belongs, the pixel type of the concerned pixel, and the determined block feature type; and performing different image quality enhancing processes based on the determined area type.

According to another aspect of the present invention, there is provided a digital image quality improving apparatus to improve a quality of a document image comprising pixels with a predetermined resolution and obtained by scanning a script comprising a combination of a background, a text, and an image. The apparatus includes a history information updating unit, a block feature type detecting unit, an area type determining unit, and an image quality enhancing unit. The history information updating unit updates history information regarding color data and a pixel type of a concerned pixel using previous history information of the concerned pixel. The block feature type detecting unit determines a block feature type of the concerned pixel using the pixel type and the updated history information of the concerned pixel. The area type determining unit determines a type of an area to which the concerned pixel belongs depending on a second type of a second area to which a first neighboring pixel in a left direction of the concerned pixel belongs, the pixel type of the concerned pixel, a third type of a third area to which a second neighboring pixel in a line above the concerned pixel belongs, and the block feature type of the concerned pixel provided by the block feature type detecting unit. The image quality enhancing unit enhances an image quality of the concerned pixel to different degrees according to the area type determined by the area type determining unit.

BRIEF DESCRIPTION OF THE DRAWINGS

The above and other features and advantages of the present invention will become more apparent by describing in detail exemplary embodiments thereof with reference to the attached drawings in which:

FIG. 1 is a flowchart illustrating a conventional method of enhancing an image quality of a document including a combination of a text and an image;

FIG. 2 is a flowchart illustrating a method of enhancing digital image quality according to an embodiment of the present invention;

DETAILED DESCRIPTION OF THE INVENTION

Figure 3A:
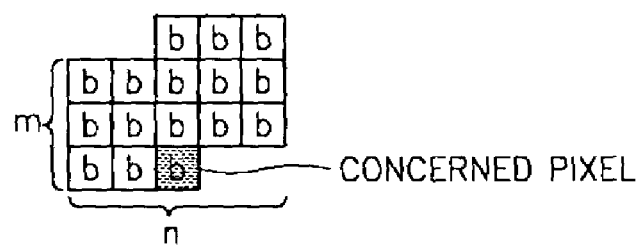
FIGS. 3A through 3C are views illustrating a concerned pixel having image and background block features in a block feature type detection of FIG. 2.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 2 is a flowchart illustrating a method of enhancing digital image quality according to an aspect of the present invention. The method includes: selecting a pixel as a concerned pixel of an image at operation 410; converting color data of the concerned pixel 210; updating history information according to a pixel type of the concerned pixel 220; determining a block feature type of the concerned pixel 230; determining a type of an area to which the concerned pixel belongs 240; and enhancing image quality of each area 250; and performing a final pixel determination operation 460.

Referring to FIG. 2, in the pixel selecting operation 410, pixel selection is performed starting from a first pixel. Thus, in an initial pixel position value setting operation 411, an initial pixel position value I is set to be zero. In an initial position value increasing operation 412, the initial pixel position value I increases by 1. Then, in the color data conversion 210, RGB color data of the concerned pixel is converted into color data having brightness, saturation, and color components. Here, a YIQ color model, an YCbCr color model, or the like is used.

In the YIQ color model, Y denotes a brightness component, and I and Q denote color components. If R, G, and B values are given, Y, I, and Q values can be expressed by Equation 1 below:

$Y=0.29900R+0.58700G+0.11400B$ $I=0.59600R-0.27500G-0.32100B$ $Q=0.21200R-0.52300G+0.31100B$ (1)

If the RGB color data is converted using the YIQ color model, it is possible that the brightness component be adopted as the Y component, and a saturation component be obtained from a sum of absolute values of I and Q components or a root mean square (RMS) of the I and Q components. A color component can be obtained by arctan $$\frac{I}{Q}.$$

In the YCbCr color model, Y represents brightness, and Cb and Cr represent blue saturation and red saturation, respectively. If R, G, and B values are given, Y, Cb, and Cr values can be expressed by Equation 2:

$Y=0.29900R+0.58700G+0.11400B$ $Cb=-0.16874R-0.33126G+0.50000B$ $Cr=0.50000R-0.41869G-0.08131B$ (2)

If RGB color data is converted using the YCbCr color model, it is possible that the brightness component be adopted as the Y component, and the color component be obtained from a sum of absolute values of Cb and Cr components or an RMS of the Cb and Cr components. The color component can be obtained by arctan $$\frac{Cb}{Cr}.$$

The history information update operation 220 includes a pixel pre-processing operation 221, a pixel type determination operation 222, and a first and second history information update/storage operation 223. Here, the pixel pre-processing operation 221 is optional. In this case, the color data provided from the color data conversion of operation 210 is provided to the pixel type determination 222.

In the pixel pre-processing operation 221, the concerned pixel is low-pass filtered or non-processed and then output according to the magnitude of a bimodality value of the concerned pixel.

In the pixel type determination operation 222, the brightness component and the saturation component of each low-pass filtered or non-processed concerned pixel in a current line are compared with a brightness threshold and a saturation threshold, respectively. Then, whether the concerned pixel is a background pixel or an image pixel is determined based on the comparison result. If the saturation component of the concerned pixel is smaller than a saturation threshold S0 and the brightness component is greater than a high brightness threshold B1, the concerned pixel is classified as the background pixel. Pixels that do not satisfy the requirements of the background pixel become non-background pixels. If the concerned pixel is a non-background pixel and the saturation component of the concerned pixel is greater than the saturation threshold S0 or the brightness component is greater than a low brightness threshold B2, the concerned pixel is classified as the image pixel. Here, the saturation threshold S0 is, for example, 15, the high brightness threshold B1 is, for example, 250 close to white, and the low brightness threshold B2 is, for example, 100 close to black.

In order to determine whether the concerned pixel is a halftone pixel, it is determined whether a four-direction connection component value of pixels in a 3×N window, e.g., a 3×3 window, around the concerned pixel is a predetermined value, preferably 2 or more. If the four-direction connection component value is 2 or more, it is determined whether a difference between a maximum value and a minimum value of brightness components of the pixels in the 3×3 window is greater than a brightness difference threshold, preferably 30 or more.

In the first and second history information update/storage operation 223, first or second history information of the concerned pixel is updated and stored based on the determination result in the pixel type determination operation 222. Here, the first history information has a value representing how many successive background pixels exist above the concerned pixel in order to determine a background block feature type, and the second history information has a value representing how many successive image pixels exist above the concerned pixel to determine an image block feature type.

If the concerned pixel is classified as the background pixel in the pixel type determination operation 222, the number of the successive background pixels above the concerned pixel and the concerned pixel are stored as the first history information regarding the concerned pixel. Preferably, if the number of the successive background pixels above the concerned pixel is a predetermined number of m or more, the number m is stored as the first history information of the concerned pixel. If the number of successive background pixels above the concerned pixel is the number m or less, a corresponding number is stored as the first history information of the concerned pixel. Preferably, at a resolution of 600 dots per inch (dpi), m can be set to be 3. In this case, a memory may be used to store the background pixel used as the first history information in a unit of $[\log_2 m+1]$ bits where [ ] denotes a Gauss symbol (the resulting integer value (function) not exceeding the integer value inside the bracket (maximum value). If m is 3, the background pixel requires 2 bits.

If the concerned pixel is classified as the image pixel in the pixel type determination operation 222, the number of the successive image pixels above the concerned pixel is stored as the second history information regarding the concerned pixel. Preferably, if the number of the image pixels above the concerned pixel and the concerned pixel is a predetermined number of p or more, the number p is stored as the second history information of the concerned pixel. If the number of image pixels above the concerned pixel is the number p or less, a corresponding number is stored as the second history information regarding the concerned pixel. Preferably, at the resolution of 600 dpi, p can be set to be 7. In this case, a second memory may be used to store the image pixel as the second history information in a unit of $[\log_2 p+1]$ bits. If p is 7, the image pixel requires 3 bits.

Accordingly, a gross memory may be used to store first and second history information regarding each pixel in one line (the number of pixels per one line ×5 bits), thus considerably reducing cost for realizing hardware.

Figure 3B:
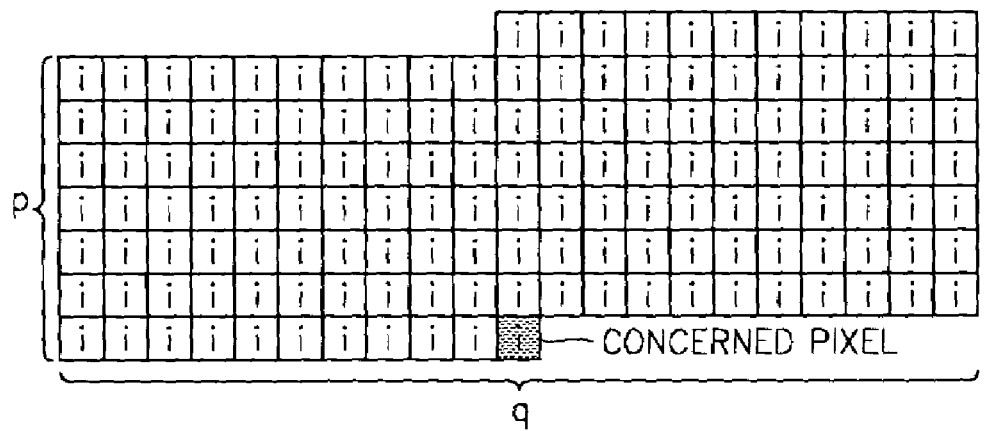
Figure 3C:
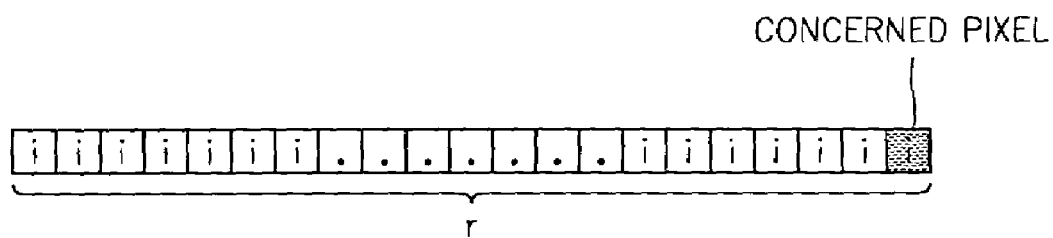

In the block feature type detection operation 230, the background block feature type and the image block feature type are detected using the first or second history information. The background block feature type is detected with reference to the first history information when m stored background pixels successively appear a number of n or more times in a left direction of the concerned pixel and/or in a right direction from a pixel of a previous line neighboring a concerned line, including the concerned pixel that is the background pixel, as shown in FIG. 3A. Preferably, at the resolution of 600 dpi, m and n can be set to be 3 and 5, respectively. The image block feature type is detected with reference to the second history information when p stored image pixels successively appear a number of q or more times in a left direction of the concerned pixel and/or in a right direction from a pixel of a previous line adjacent to a concerned line, including the concerned pixel that is an image pixel, as shown in FIG. 3B. Preferably, at the resolution of 600 dpi, p and q can be set to be 7 and 20, respectively. As shown in FIG. 3C, the image block feature type can also be detected when the non-background pixels successively appear a number of r or more times in the left direction of the concerned pixel, including the concerned pixel that is the image pixel. Preferably, at the resolution of 600 dpi, r can be set to be 200.

A halftone block feature type is detected when the concerned pixel is a halftone pixel, and the concerned pixel and the halftone pixel exist within a range of a standard halftone distance in the left direction, preferably within a halftone range of 11, or a pixel of an upper line adjacent to the concerned pixel belongs to a halftone image area.

In the area type determination operation 240, a type of an area to which the concerned pixel belongs is determined based on a second area to which a previous pixel on the left side of the concerned pixel belongs, a third area to which a pixel adjacent to a concerned pixel in a previous line belongs, the pixel type in the pixel type determination operation 222, and the block feature type in the block feature type detection operation 230.

In the image quality enhancement operation 250, when the type of the area to which the concerned pixel belongs is determined in the area type determination operation 240, an image quality of each area is enhanced to different degrees. Here, unsharpened masking can be used as an emphasis technique used during the image quality enhancement operation 250. According to the unsharpened masking, brightness of a pixel to be emphasized is obtained by Equation 3:

$$Le = L5 + k(L5 - Lavg) \quad (3)$$

In Equation 3 above, L5 denotes the original brightness of the pixel to be emphasized, Lavg denotes an average value of the brightness in a set window, Le denotes an emphasized brightness value, and k is an emphasis coefficient.

If the concerned pixel is classified as a text area, the brightness of the concerned pixel is classified into high, middle, and low bright classes, i.e., three brightness classes, in order to maximize a difference between the text area and an image area. Next, if the brightness of the concerned pixel belongs to the high brightness class, when a color image with 256 scale is output, each of R, G, and B is set to 255 to fill the concerned pixel with a white color. If the brightness of the concerned pixel belongs to the low brightness class, each of R, G, and B is set to zero to fill the concerned pixel with a black color. If the brightness of the concerned pixel belongs to the middle brightness class that mostly appears at the boundary between the text area and the image area, the unsharpened masking is performed to emphasize the boundary of the text area. The emphasis coefficient used during the unsharpened masking can be calculated using a mean brightness of 3×3 pixels neighboring the concerned pixel. Preferably, the mean brightness and the emphasis coefficient vary in a straight line that connects a pixel (100, 6) and a pixel (250, 1). If the concerned pixel is classified into a background area, an original image is output.

If the concerned pixel is classified into a continuous tone image area, the unsharpened masking is performed to emphasize the boundary of the continuous tone image area. The emphasis coefficient used during the unsharpened masking can be calculated using the mean brightness of the 3×3 pixels neighboring the concerned pixel. Preferably, the mean brightness and the emphasis coefficient vary in a straight line that connects a pixel (0, 6) and a pixel (255, 1).

If the concerned pixel is classified into a halftone image area, the original image is output, a LPF is used to prevent the appearance of a pattern unpleasant to viewer's eyes, or the unsharpened masking using a very small emphasis coefficient, preferably 1 or less, is employed.

Figure 4:
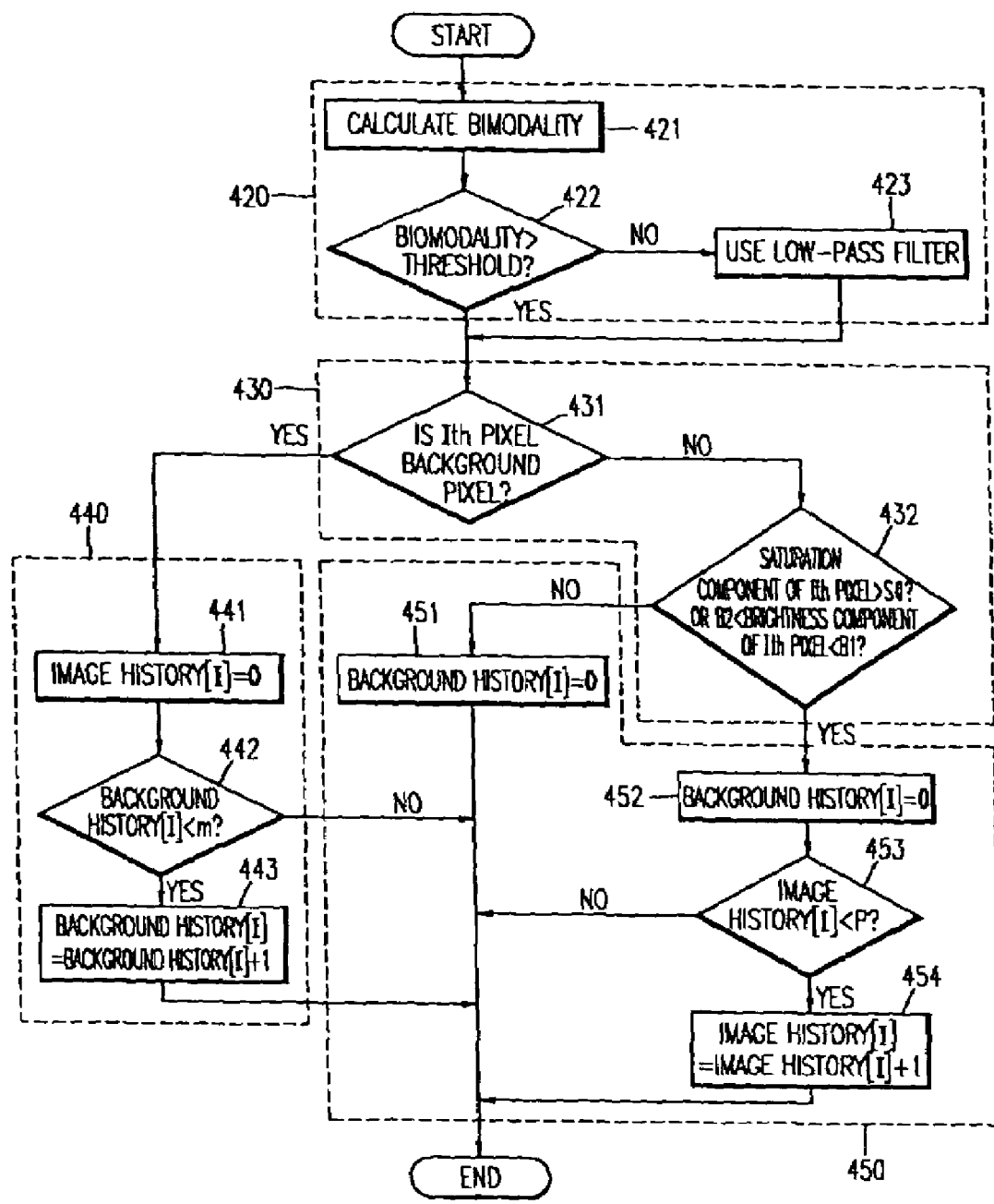
FIG. 4 is a flowchart illustrating a history information update of FIG. 2 in accordance with an aspect of the present invention.

FIG. 4 is a flowchart illustrating an aspect of the history information update operation 220 of FIG. 2. The history information update operation 220 includes a pixel pre-processing operation 420, a pixel type determination 430, a first history information update 440, and a second history information update operation 450. Here, the pixel pre-processing operation 420 is optional.

Referring to FIG. 4, in a bimodality calculation operation 421 of the pixel preprocessing operation 420, a bimodality of pixels in a 3×N window (where N is 3 or more), e.g., a 3×3 window, around the concerned pixel are calculated. In a bimodality magnitude comparison operation 422, the bimodality in the bimodality calculation operation 21 is compared with a predetermined bimodality threshold, and then it is determined whether the bimodality is greater than the predetermined bimodality threshold. Here, the predetermined bimodality threshold is preferably set to be 50.

If the bimodality is greater than the predetermined bimodality threshold in the bimodality magnitude comparison operation 422, the concerned pixel is not additionally processed, and then a pixel type determination operation 430 is performed. If the bimodality is less than the predetermined bimodality threshold, the concerned pixel is low-pass filtered in a concerned pixel low-pass filtering operation 423, and then the pixel type determination operation 430 is performed. Here, the bimodality greater than the predetermined bimodality threshold indicates that the concerned pixel is a pixel positioned around the boundary of the text area or belonging to the halftone image area. The bimodality less than the predetermined bimodality threshold indicates that the concerned pixel is a pixel belonging to the background area or the continuous tone image area.

In an $I^{th}$ pixel type determination operation 431 of the pixel type determination operation 430, it is determined whether the saturation component of the $I^{th}$ pixel is smaller than the saturation threshold S0 and the brightness component of the $I^{th}$ pixel is greater than the high brightness threshold B1. If the saturation component of the $I^{th}$ pixel is smaller than the saturation threshold S0 and the brightness component is greater than the high brightness threshold B1, the $I^{th}$ pixel is determined as the background pixel. If the $I^{th}$ pixel is determined as the non-background pixel in the $I^{th}$ pixel type determination operation 431, it is determined whether the $I^{th}$ pixel is the image pixel in an $I^{th}$ pixel type determination 432. Here, if the saturation component of the $I^{th}$ pixel is greater than the saturation threshold S0 or the brightness component is greater than the low brightness threshold B2 and smaller than the high brightness threshold B1, the $I^{th}$ pixel is classified as the image pixel.

If the $I^{th}$ pixel is determined as the background pixel in the $I^{th}$ pixel type determination operation 431, in an $I^{th}$ pixel image history setting operation 441 of the first history information update operation 440, an image history of the $I^{th}$ pixel is set to be zero. In a background history magnitude determination operation 442, it is determined whether an already-stored background history is less than a predetermined number m, e.g., 3. If the background history is equal to or greater than the number m in the background history magnitude determination operation 442, the background history is maintained at the number m. If the background history is less than the number m, the background history increases by 1.

If the $I^{th}$ pixel is neither the background pixel nor the image pixel in the $I^{th}$ pixel type determination operation 432, in an $I^{th}$ pixel background history setting operation 451 of the second history information update operation 450, a background history of the $I^{th}$ pixel is set to be zero. If the $I^{th}$ pixel is determined as the image pixel in the $I^{th}$ pixel type determination operation 432, in an $I^{th}$ pixel background history setting operation 452, the background history of the $I^{th}$ pixel is set to be zero. In an image history magnitude determination operation 453, whether an already-stored image history is less than a predetermined number p, e.g., 7, is determined. If the image history is equal to or greater than the number p, the background history is maintained at the number p. If the image history is less than the number p, the image history increases by 1.

A method of calculating the bimodality in the bimodality calculation operation 421 of the pixel pre-processing operation 420 of FIG. 4 will be described with reference to FIG. 5.

Figure 5:
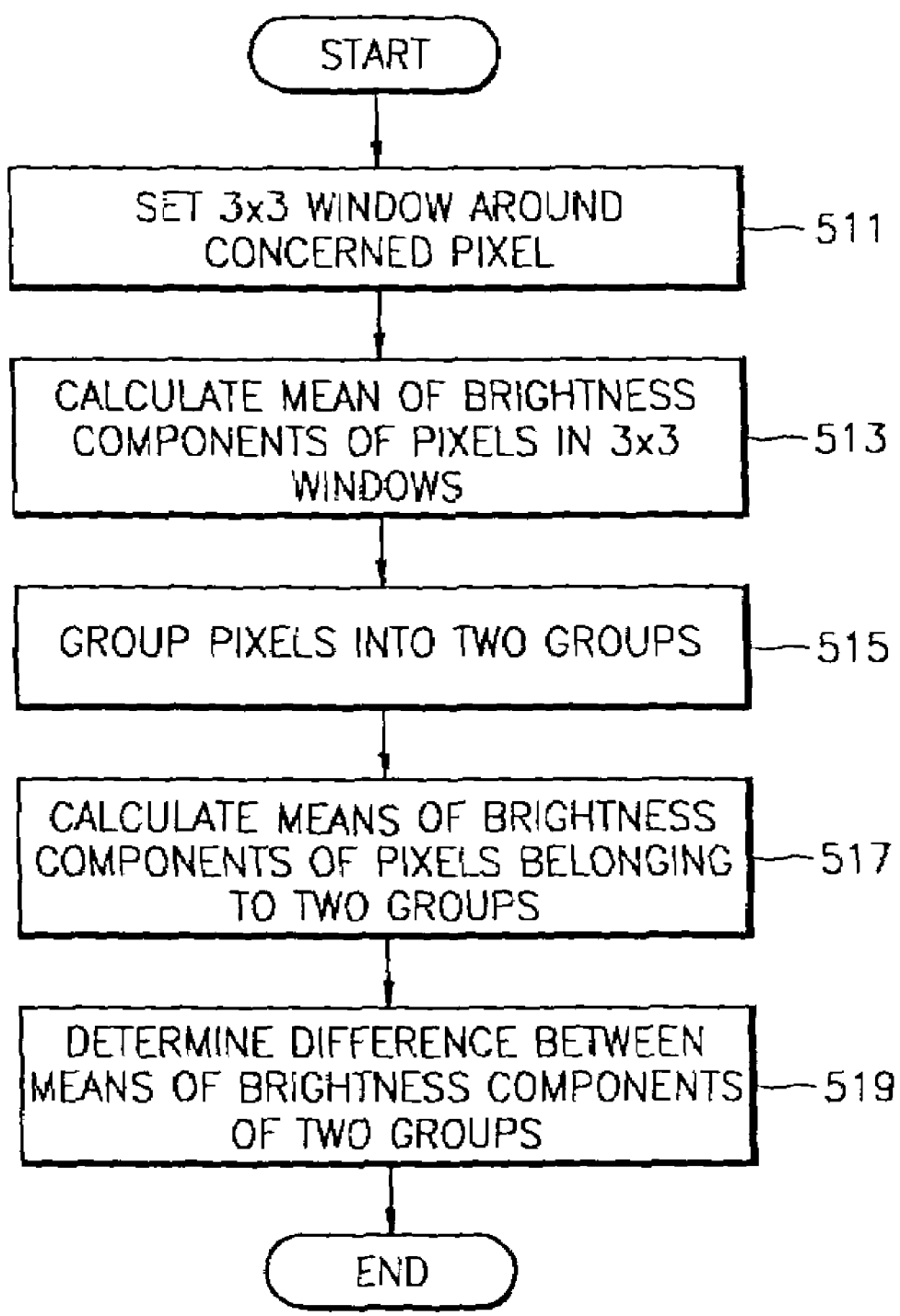
FIG. 5 is a flowchart illustrating a bimodality calculation of FIG. 4.

Referring to FIG. 5, the bimodality calculating method includes a window setting operation 511, a mean brightness component calculation operation 513, a grouping operation 515, and bimodality determination operations 517 and 519.

In the window setting operation 511, the 3×3 window is set around the concerned pixel. In the mean brightness component calculation operation 513, a mean of brightness components of all pixels in the 3×3 window is calculated.

In the grouping operation 515, the mean in the mean brightness component calculation operation 513 is compared with each of the brightness components of all the pixels in the 3×3 window to group the pixels into a first pixel group having a higher brightness component than the mean and a second pixel group having a lower brightness component than the mean.

In the bimodality determination operation 517, a first sub-mean of brightness components of pixels belonging to the first pixel group and a second sub-mean of brightness components of pixels belonging to the second pixel group are calculated. In the bimodality determination operation 519, a difference between the first and second sub-means of the brightness components of the first and second pixel groups in the bimodality determination operation 517 is calculated to determine the difference as the bimodality of a corresponding concerned pixel.

A method of calculating a connection component value CC of the pixels in the 3×3 window in order to determine the halftone pixel in the pixel type determination operation 221 of FIG. 2 will be described with reference to FIGS. 6 through 8.

Figure 6:
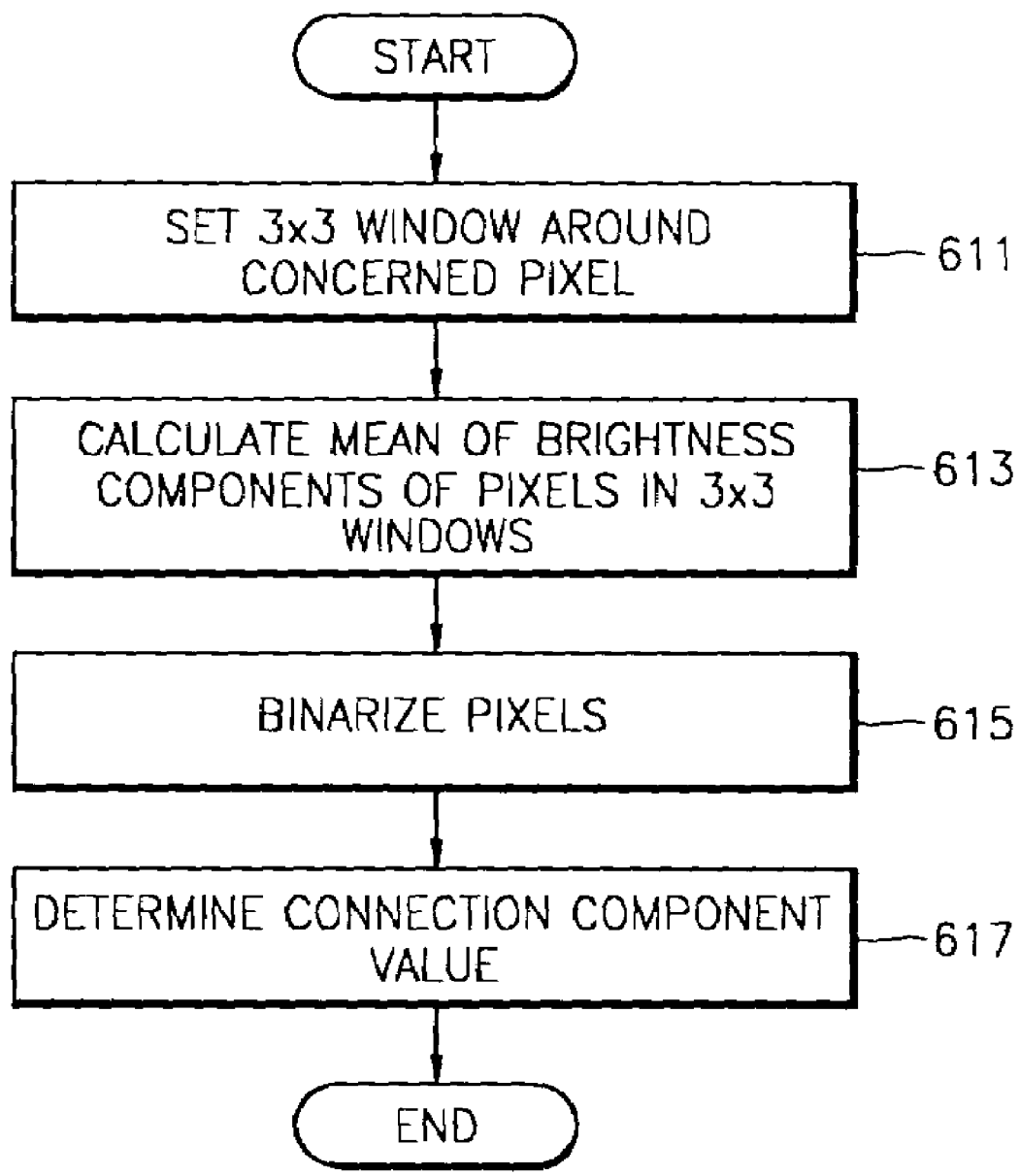
FIG. 6 is a flowchart illustrating a method of obtaining a connection component value to determine a halftone pixel in a pixel type determination of FIG. 2, in accordance with an aspect of the present invention.

Referring to FIG. 6, the connection component value calculating method includes a window setting operation 611, a mean brightness component calculation operation 613, a binarization operation 615, and a connection component value determination operation 617.

In the window setting operation 611, the 3×3 window is set around the concerned pixel. In operation 613, a mean of brightness components of all pixels in the 3×3 window is calculated.

In the binarization operation 615, another mean in the mean brightness component calculation operation 613 is compared with each of the brightness components of all the pixels in the 3×3 window, and then "1" or "0" is allocated to each of the brightness components based on the comparison result to perform binarization. For example, if a brightness component of a corresponding pixel is less than the another mean, "1" is allocated to the corresponding brightness component, while if the brightness component of the corresponding pixel is greater than the another mean, "0" is allocated to the corresponding brightness component.

In the connection component value determination operation 617, the connection component value CC is determined according to different calculation methods based on binary values of the concerned pixel by using a logic circuit instead of a lookup table in order to minimize an amount (capacity) of a required memory. This will be explained in more detail with reference to FIGS. 7 and 8.

Figure 7:
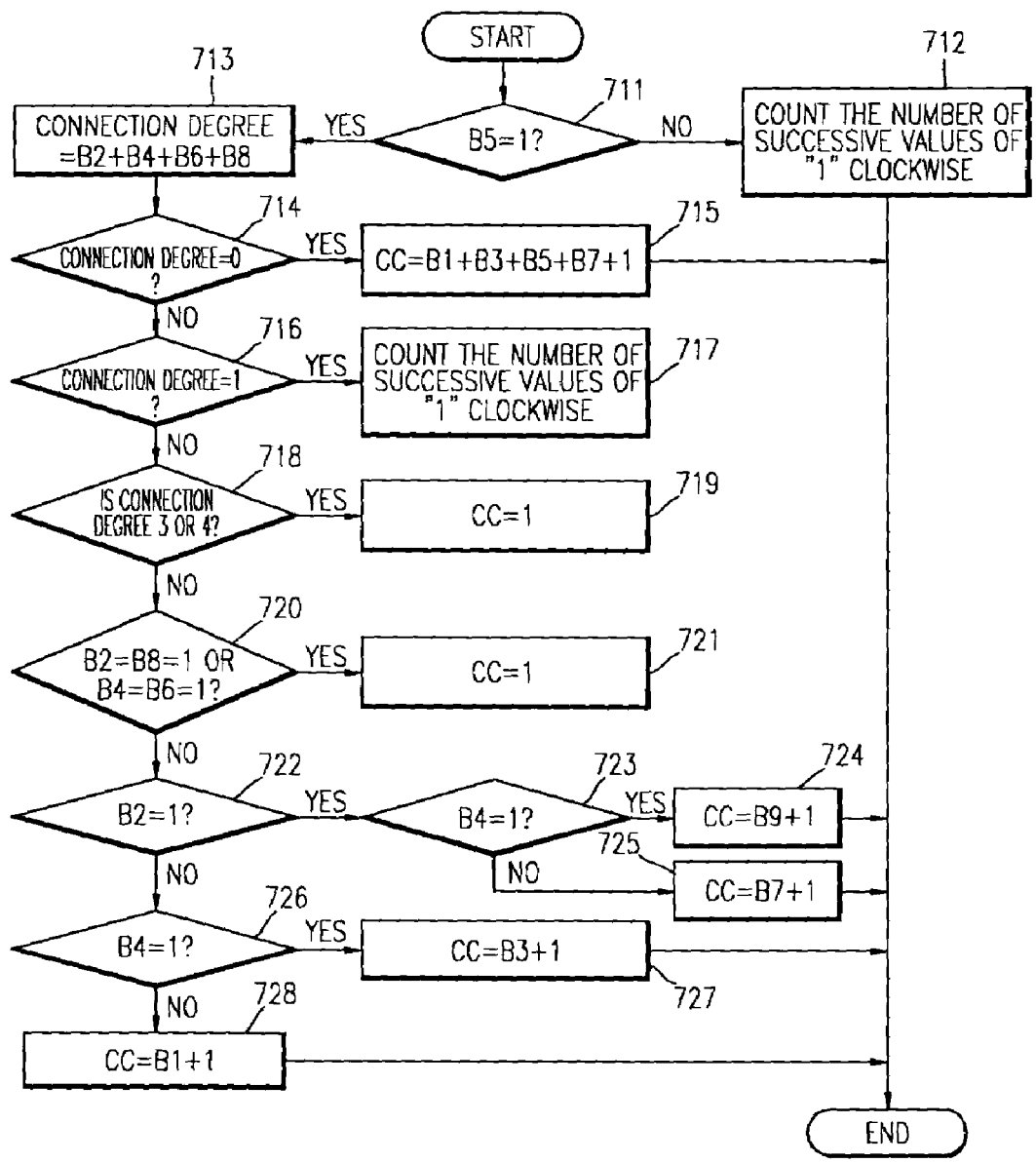
FIG. 7 is a flowchart illustrating a connection component value obtaining method depending on binary values of a concerned pixel of FIG. 5, in accordance with an aspect of the present invention.
Figure 8:
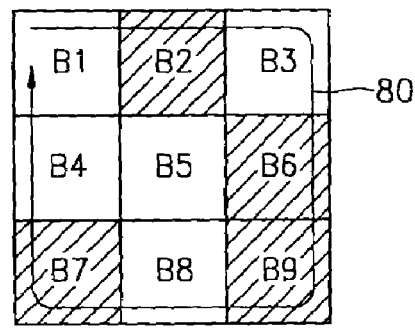
FIG. 8 is a view illustrating the connection component value obtaining method depending on the binary values of the concerned pixel of FIG. 5, in accordance with another aspect of the present invention.

Referring to FIG. 7, in a binary value determination operation 711, whether a binary value of the concerned pixel, i.e., a pixel B5, is "1" is determined.

If the binary value of the concerned pixel is "0" in the binary value determination operation 711, the number of successive blocks having binary values of "0" and "1" that successively appear starting from a pixel B1 along a clockwise direction 80 is counted to determine the number of successive blocks as the connection component value CC in a connection component value determination operation 712. For example, as shown in FIG. 8, if pixels B1, B3, B4, and B8 including a pixel B5 that is a concerned pixel have values of "0", the connection component value CC becomes 3.

If the binary value of the pixel B5 is "1" in the binary value determination operation 711, a sum of binary values of pixels B2, B4, B6, and B8 is defined as a connection degree, and then the connection component value CC is determined according to different methods based on the connection degree in a connection degree definition operation 713. If the connection degree has the binary value of "0, ", , a value obtained by adding "1" to a sum of binary values of pixels B1, B3, B7 and B9 is determined as the connection component value CC in a connection component determination operation 715. If the connected degree has a non-zero value in the binary connection degree value determination operation 714, it is determined whether the connection degree has a value of "1" in a connection degree determination operation 716. If the connection degree has the value of "1," the number of values of "1" that successively appear in a clockwise direction 80 is counted in a connection component value determination operation 717 to determine the number of values of "1" as the connection component value CC.

If the connection degree does not have the value of "1" in the connection degree determination operation 716, it is determined whether the connection degree has a value of "3" or "4" in a connection degree determination operation 718. If the connection degree has the value of "3" or "4," the connection component value CC is then determined to be 1 in a connection component value determination operation 719. If the connection degree has a value of "2" in the connection degree determination 718, then it is determined whether the pixels B2 and B8 each have a binary value of "1" or the pixels B4 and B6 each have a binary value of "1" in a binary value determination operation 720. If the pixels B2 and B8 each have the binary value of "1" or the pixels B4 and B6 each have the binary value of "1," the connection component value CC is determined to be 1 in a connection component determination operation 721.

If the pixel B2 or B8 does not have the binary value of "1" and the pixel B4 or B6 does not have the binary value of "1" in the binary value determination operation 720, then it is determined whether the pixel B2 has a binary value of "1" in the binary value determination operation 722. If the pixel B2 has the binary value of "1," then it is determined whether the pixel B4 has a binary value of "1" in a binary determination operation 723. If the pixel B4 has the binary value of "1," the connection component value CC is determined in a connection component determination operation 721 as a value obtained by adding "1" to a binary value of the pixel B9. If the pixel B4 does not have the binary value of "1" in the binary value determination 723, the connection component value CC is then determined in a connection component value determination operation 725 as a value obtained by adding "1" to a binary value of the pixel B7.

If the pixel B2 does not have the binary value of "1" in the binary value determination operation 722, then it is determined whether the pixel B4 has a binary value of "1" in the binary value determination operation 726. If the pixel B4 has the binary value of "1," the connection component value CC is determined as a value obtained by adding "1" to a binary value of the pixel B3 in a connection component value determination operation 727. If the pixel B4 does not have the binary value "1" in the binary value determination operation 726, the connection component value CC is then determined as a value obtained by adding "1" to a binary value of the pixel B1 in a connection component value determination operation 728.

Figure 9:
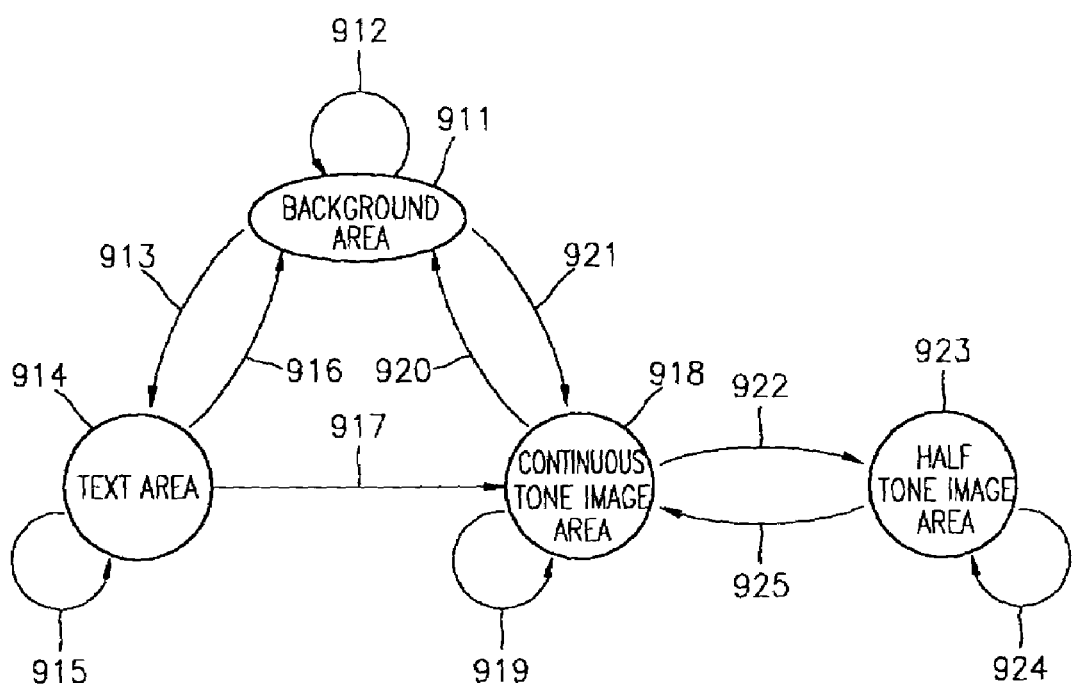
FIG. 9 is view illustrating an area type determination of FIG. 2, in accordance with an aspect of the present invention.

FIG. 9 illustrates an aspect of the area type determination operation 240 of FIG. 2. Prior to the explanation of the area type determination operation 240, an image mark memory usable to determine the continuous tone image area in area type determination operation 240 will be described.

The image mark memory is a line memory having a width of 1 bit in which when the concerned pixel is classified into the continuous tone image area due to the detection of the image block feature type, a position next to a position in which the background block feature type is finally detected on the left side of the concerned pixel is set to be 1. As a result, the continuous tone area can be segmented starting from a position in a next line in which the image mark memory is set to be 1.

Referring to FIG. 9, if a previous pixel belongs to the background area in a state 911 and the concerned pixel is the non-background pixel in a state 913, the concerned pixel is classified into the text area. If the concerned pixel is the background pixel in a state 912, the concerned pixel remains belonging to the background area. When the image mark memory is used, the previous pixel belongs to the background area in the state 911, and the image mark memory is set to be 1 in a state 921, the concerned pixel is classified into a continuous tone image area.

If the previous pixel belongs to the text area in a state 914 and the background block feature type is detected from the concerned pixel in a state 916, the concerned pixel is classified into the background area. If the image block feature type is detected from the concerned pixel or the image mark memory is set to be 1 in a state 917, the concerned pixel is classified into the continuous tone image area. Even if a pixel of an upper line adjacent to the concerned pixel belongs to the continuous tone image area or the halftone image area in a state 917, the concerned pixel is classified into the continuous tone image area. If the concerned pixel does not satisfy these requirements in a state 915, the concerned pixel remains belonging to the text area.

If the previous pixel belongs to the continuous tone image area in a state 918 and the background block feature type is detected from the concerned pixel in a state 920, the concerned pixel is classified into the background area. If the halftone block feature type is detected from the concerned pixel in a state 922, the concerned pixel is classified into the halftone image area. If the concerned pixel does not meet these requirements in a state 919, the concerned pixel remains belonging to the continuous tone image area.

If the previous pixel belongs to the halftone image area in a state 923 and the concerned pixel satisfies one of two requirements for determining halftone pixels, i.e., a four-direction connection component value should be 2 or more and a difference between a maximum value and a minimum value of the brightness components of the pixels in the 3×3 window around the concerned pixel should be greater than a brightness difference threshold, the concerned pixel is then classified into the halftone image area in a state 924. If the concerned pixel does not meet both of two requirements stated above, the concerned pixel is then classified into the continuous tone image area in a state 925.

Figure 10:
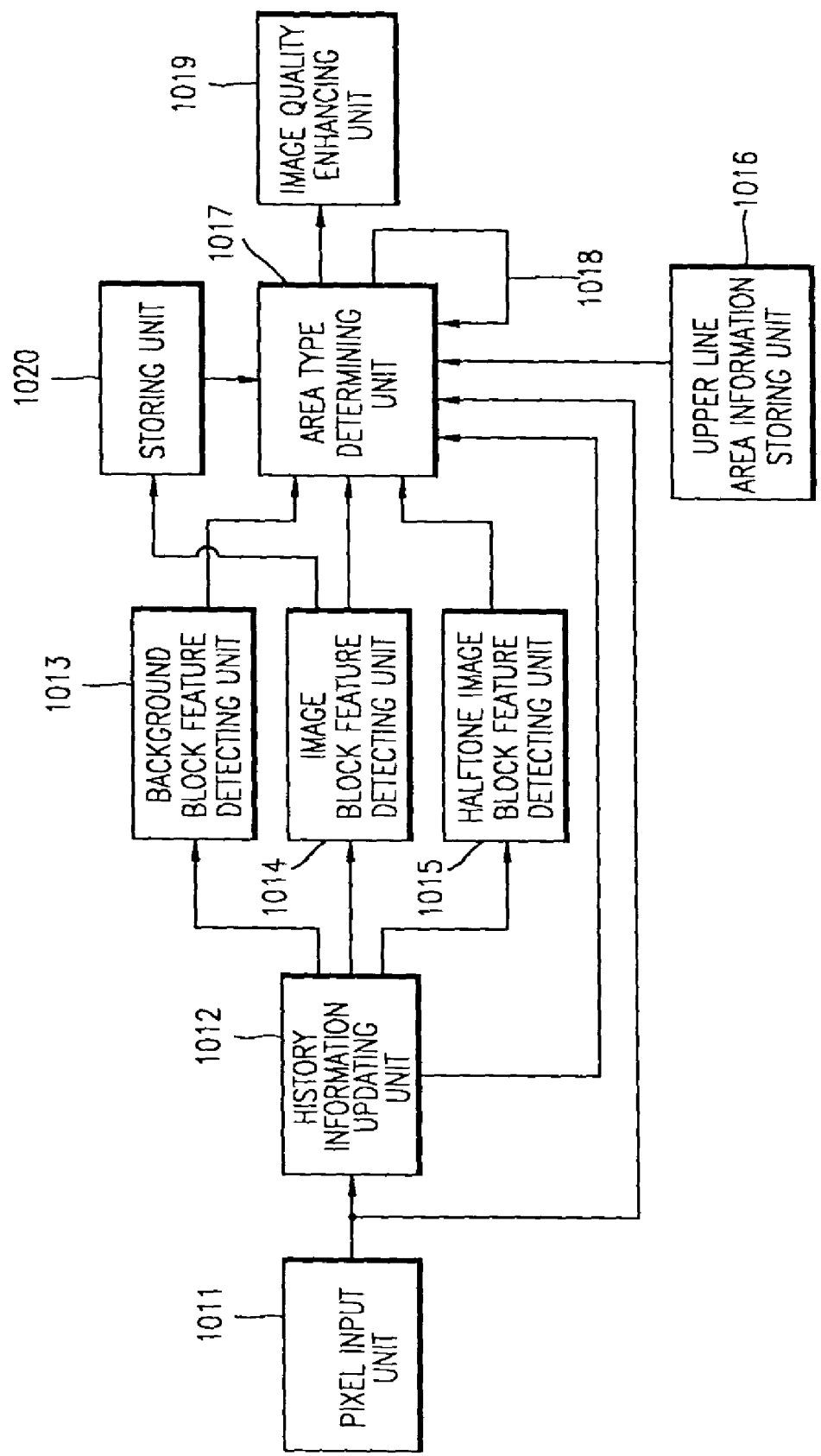
FIG. 10 is a block diagram of an apparatus to enhance digital image quality according to an aspect of the present invention.

FIG. 10 is a block diagram of a digital image quality enhancing apparatus according to an aspect of the present invention. The digital image quality enhancing apparatus includes a pixel input unit 1011, a history information updating unit 1012, a background block feature detecting unit 1015, an image block feature detecting unit 1014, a halftone block feature detecting unit 1015, an upper line information storing unit 1016, an area type determining unit 1017, an image quality enhancing unit 1019, and a storing unit 1020. Here, the storing unit 1020 is optional in the digital image quality enhancing apparatus.

The pixel input unit 1011 inputs the color data of the pixels, which have been converted into YIQ or YCrCb color spaces, and then obtains brightness, saturation, and color components from the color data of the concerned pixel, on a pixel-by-pixel basis.

The history information updating unit 1012 updates the history information depending the type of the concerned pixel provided by the pixel input unit 1011 using previous history information of the concerned pixel. For this, the concerned pixel is low-pass filtered or non-processed according to the magnitude of the bimodality of the concerned pixel and then output. Next, the brightness component and the saturation component of each concerned pixel in the current line output after being low-pass filtered or non-processed are compared with the brightness threshold and the saturation threshold, respectively. Thereafter, whether each concerned pixel is the background pixel or the image pixel is determined based on the comparison result.

If a first number of m stored pixels, from which the background block feature type is to be detected, successively appear by a second number of n pixels, from which the background block feature type is to be detected, in the left direction of the concerned pixel, the background block feature detecting unit 1013 classifies the concerned pixel as a pixel having the background block feature type with reference to the history information. Here, m and n may be 3 and 5, respectively.

If a first number of p stored pixels, from which the image block feature type is to be detected, successively appear by a second number of q pixels, from which the image block feature is to be detected, in the left direction of the concerned pixel, the image block feature detecting unit 1014 classifies the concerned pixel as a pixel having the image block feature type with reference to the history information. Here, p and q may be 7 and 20, respectively.

The halftone block feature detecting unit 1015 classifies the concerned pixel as a pixel having the halftone block feature type using the pixel type of the concerned pixel, pixel types of pixels in the left side of the concerned pixel, and types of areas to which pixels upwardly neighboring the concerned pixel belong.

The upper line area information storing unit 1016 stores information on types of areas to which neighboring pixels in a line above the concerned pixel belong.

The storing unit 1020 is the image mark memory having line memories having a width of 1 bit in which when the image block feature detecting unit 1014 detects the image block feature type from the concerned pixel, a position next to a position, from which the background block feature type is finally detected, in the left side of the concerned pixel is set to be 1.

The area type determining unit 1017 determines the type of an area to which the concerned pixel belongs based on a second type of a second area to which a first neighboring pixel in the left side of the concerned pixel recorded in an internal memory (not shown) 1018, the pixel type of the concerned pixel provided from the history information updating unit 1012, a second type of a second neighboring pixel in a line above the concerned pixel that is provided from the upper line area information storing unit 1016, the types of the background, image, and halftone block feature types provided from the background, image, and halftone block feature detecting units 1013, 1014, and 1015, and the information stored in the image mark memory of the storing unit 1020.

The image quality enhancing unit 1019 enhances an image quality of the concerned pixel to different degrees depending on the area type determined by the area type determining unit 1017.

As described above, according to the present invention, a document image obtained by scanning a document including a combination of a text and an image can be segmented into a text area, a background area, a halftone image area, and a continuous tone image area. Next, an image quality enhancing process suitable for each of the text area, the background area, the halftone image area, and the continuous tone image area can be performed to obtain a considerably improved image quality print.

In addition, first and second history information can be used to detect background and image block features and a logic circuit can be used to determine a connection component value. As a result, the amount (capacity) of the required memory can be minimized, which results in a considerable reduction in cost for realizing hardware.

Moreover, when the first and second history information is updated, the bimodality of the concerned pixel is compared with the predetermined threshold, and then whether pre-processing, such as low-pass filtering or the like, is performed is determined based on the comparison result. Thus, the accurate segmentation of the text area and the halftone image area can be achieved. Also, a reduction in the amount of information used to detect the halftone block feature type can reduce an amount of a line memory.

The above-described embodiments of the present invention can be written as programs which can be executed in a computer and can be realized in a general-purpose digital computer, which executes the programs, using computer-readable recording media. Computer-readable recording media include magnetic storage media such as ROMs, floppy discs, hard discs or the like, optical reading media such as CD-ROMs, DVDs, or the like, and storage media using carrier waves transmitted via the Internet.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A digital image quality enhancing method to improve a quality of a document image comprising pixels with a predetermined resolution and obtained by scanning a script comprising a combination of a background, a text, and an image, the method comprising:

updating history information regarding color data and a pixel type of a concerned pixel using previous history information of the concerned pixel;

determining a block feature type of the concerned pixel using the pixel type and the updated history information of the concerned pixel;

determining a type of an area to which the concerned pixel belongs based on a second type of a second area to which a first neighboring pixel in a left direction of the concerned pixel belongs, a third type of a third area to which a second neighboring pixel in a line above the concerned pixel belongs, the pixel type of the concerned pixel, and the determined block feature type; and performing different image quality enhancing processes on the concerned pixel based on the determined area type.

2. The digital image quality enhancing method of claim 1, wherein the updating of the history information comprises:

low-pass filtering (pre-processing) the concerned pixel according to a magnitude of a bimodality of the concerned pixel.

3. The digital image quality enhancing method of claim 2, wherein the pre-processing of the concerned pixel comprises:

calculating the bimodality of the concerned pixel;
comparing the bimodality with a predetermined threshold; and when the bimodality is less than the predetermined threshold in the bimodality comparison, performing the low pass filtering.

4. The digital image quality enhancing method of claim 3, wherein the calculation of the bimodality comprises:

calculating a mean of brightness components of all pixels in a window of a predetermined size around the concerned pixel;

grouping the pixels in the window into a first pixel group having a higher brightness component than the mean and a second pixel group having a lower brightness component than the mean; and determining a difference between a first sub-mean of brightness components of pixels belonging to the first pixel group and a second sub-mean of brightness components of pixels belonging to the second pixel group as the bimodality of the concerned pixel.

5. The digital image quality enhancing method of claim 1, wherein the updating of the history information comprises:

determining whether the concerned pixel is a background pixel or an image pixel using brightness and saturation components of the concerned pixel and whether the concerned pixel is a halftone pixel using the brightness component and a connection component;

when the concerned pixel is determined as the background pixel, updating first history information by storing the concerned pixel and a number of background pixels that successively appear above the concerned pixel as the first history information of the concerned pixel; and when the concerned pixel is determined as the image pixel, updating second history information by storing the concerned pixel and a number of image pixels that successively appear above the concerned pixel as the second history information of the concerned pixel.

6. The digital image quality enhancing method of claim 5, wherein the determination of the pixel type comprises:

when the brightness component of the concerned is greater than a high brightness threshold and the saturation component of the concerned pixel is less than a saturation threshold, classifying the concerned pixel as the background pixel;

when the brightness component of the concerned pixel is greater than a low brightness threshold and less than the high brightness threshold or the saturation component of the concerned pixel is greater than the saturation threshold, classifying the concerned pixel as the image pixel; and obtaining a difference between the connection component and the brightness component in the window of a predetermined size around the concerned pixel and classifying the concerned pixel as the halftone pixel using the connection component, the brightness component, and the obtained difference between the connection component and the brightness component.

7. The digital image quality enhancing method of claim 6, wherein the classification of the concerned pixel as the halftone pixel comprises:

obtaining the connection component of pixels in a window;
comparing a difference between a maximum value and a minimum value of brightness components of the pixels in the window with a brightness difference threshold; and when the connection component is greater than a predetermined value and the difference is greater than the brightness difference threshold, determining the concerned pixel as the halftone pixel.

8. The digital image quality enhancing method of claim 7, wherein the obtaining of the connection component comprises:
- binarizing the pixels in the window using the brightness component; and
- obtaining the connection component according to different methods based on a binary value allocated to the concerned pixel as the binarization result.

9. The digital image quality enhancing method of claim 8, wherein the binarizing of the pixels comprises:
- calculating a mean of the brightness components of all the pixels in the window; and
- comparing the mean with each of the brightness components of all of the pixels to perform the binarization based on the comparison result.

10. The digital image quality enhancing method of claim 9, wherein the obtaining of the connection component comprises:
- when the brightness components of the concerned pixel are greater than the mean, counting the number of blocks comprising pixels that successively appear clockwise and have different binary values from a binary value of the concerned pixel to determine the counted number as the connection component.

11. The digital image quality enhancing method of claim 10, wherein the obtaining of the connection component comprises:
- when the brightness component of the concerned pixel is less than the mean, determining the connection component according to different methods based on a magnitude of a sum of binary values of pixels located in four directions from the concerned pixel.

12. The digital image quality enhancing method of claim 5, wherein the updating of the first history information comprises:
- setting a first number m to determine the background block feature when the number of background pixels that successively appear above the concerned pixel is greater than the first number m;
- storing the first number m as the first history information; and
- when the number of background pixels is less than the first number m, storing a corresponding number of background pixels as the first history information.

13. The digital image quality enhancing method of claim 5, wherein the updating of the second history information comprises:
- setting a first number p to determine the image block feature when the number of image pixels that successively appear above the concerned pixel is greater than the first number p;
- storing the first number p as the second history information; and
- when the number of image pixels is less than the first number p, storing a corresponding number of image pixels as the second history information.

14. The digital image quality enhancing method of claim 1, wherein the determining of the block feature type comprises:
- when a first number of m pixels, from which a background block feature type is to be detected, successively appear by a second number of n, from which the background block feature is to be detected, in left and right directions of the concerned pixel, classifying the concerned pixel as a pixel having the background block feature type with reference to the history information;
- when a third number of p pixels, from which an image block feature type is to be detected, successively appear by a fourth number of q pixels, from which the image block feature type is to be detected, in the left and right directions of the concerned pixel, classifying the concerned pixel as a pixel having the image block feature type; and
- classifying the concerned pixel as a pixel having a halftone block feature type using the pixel type of the concerned pixel, pixel types of pixels in the left direction of the concerned pixel, and the third type of the third area to which the neighboring pixel above the concerned pixel belongs.

15. The digital image quality enhancing method of claim 14, wherein the classifying of the concerned pixel as the pixel having the halftone block feature type comprises:
- when the concerned pixel is a halftone pixel, determining whether the halftone pixel exists within a halftone distance threshold in the left direction of the concerned pixel;
- when the concerned pixel is the halftone pixel, determining whether the third area to which the second neighboring pixel above the concerned pixel belongs is the halftone image area; and
- when the concerned pixel satisfies one of the two determination requirements, classifying the concerned pixel as a pixel having the halftone block feature.

16. The digital image quality enhancing method of claim 14, wherein the determining of the block feature type further comprises:
- setting a first position following a second position from which the background block feature type is finally detected in the left direction of the concerned pixel to be 1 in an image mark memory when the image block feature type is detected from the concerned pixel in the classification of the concerned pixel as the pixel having the image block feature.

17. The digital image quality enhancing method of claim 1, wherein the determining of the area type comprises:
- when the second area to which the first neighboring pixel in the left direction of the concerned pixel belongs is a background area, determining the area to which the concerned pixel belongs as one of a text area and the background area depending on the pixel type of the concerned pixel;
- when the second area to which the first neighboring pixel in the left direction of the concerned pixel belongs is the text area, determining the area to which the concerned pixel belongs as one of the background area, a continuous tone image area, and the text area depending on the block feature type of the concerned pixel and the third type of the third area to which the second neighboring pixel above the concerned pixel belongs;
- when the second area to which the first neighboring pixel in the left direction of the concerned pixel belongs is the continuous tone image area, determining the area to which the concerned pixel belongs as one of the background area, the halftone image area, and the continuous tone image area depending on the block feature type of the concerned pixel; and
- when the second area to which the first neighboring pixel in the left direction of the concerned pixel belongs is the halftone image area, determining the area to which the concerned pixel belongs as one of the halftone image area and the continuous tone image area based on the pixel type of the concerned pixel.

18. The digital image quality enhancing method of claim 17, wherein the determining of the concerned pixel as one of the text area and the background area comprises:

determining whether the concerned pixel is the background pixel when the concerned pixel is the background pixel;

determining the area to which the concerned pixel belongs as the background area; and when the concerned pixel is not the background pixel, determining the area to which the concerned pixel belongs as the text area.

19. The digital image quality enhancing method of claim 17, wherein the determining of the area of the concerned pixel as one of the background area, the continuous tone image area, and the text area comprises:

when the concerned pixel has the background block feature, classifying the concerned pixel into the background area;

when the concerned pixel has the image block feature or the image mark memory for a previous line is set to be 1, classifying the concerned pixel into the continuous tone image area;

when the area to which the neighboring pixel above the concerned pixel belongs is one of the continuous tone image area and the halftone image area, classifying the concerned pixel into the continuous tone image area; and when the concerned pixel does not satisfy any one of the above requirements for determining the type of the area to which the concerned pixel belongs, determining the area to which the concerned pixel belongs as the text area.

20. The digital image quality enhancing method of claim 17, wherein the determining of the area of the concerned pixel as one of the background area, the halftone image area, and the continuous tone image area comprises:

when the concerned pixel has the background block feature, classifying the concerned pixel into the background area;

when the concerned pixel has the halftone block feature, classifying the concerned pixel into the halftone image area; and when the concerned pixel has neither the background block feature nor the halftone block feature, determining the area to which the concerned pixel belongs as the continuous tone image area.

21. The digital image quality enhancing method of claim 17, wherein the determining of the area of the concerned pixel as one of the halftone image area and the continuous tone image area comprises:

determining whether the concerned pixel is the halftone pixel when the concerned pixel is the halftone pixel;

determining the area to which the concerned pixel belongs as the halftone image area; and when the concerned pixel is not the halftone pixel, determining the area to which the concerned pixel belongs as the continuous tone image area.

22. The digital image quality enhancing method of claim 1, wherein the performing of the different image enhancing processes comprises:

when the area to which the concerned pixel belongs is determined as the text area in the determination of the area type of the concerned pixel, performing one of white-filling, black-filling, and unsharpened masking using a first emphasis coefficient on the concerned pixel according to the magnitude of the brightness component of the concerned pixel;

when the area to which the concerned pixel belongs is determined as the continuous tone image area in the determination of the area type of the concerned pixel, performing unsharpened masking using a second emphasis coefficient on the concerned pixel;

when the area to which the concerned pixel belongs is determined as the halftone image area in the determination of the area type of the concerned pixel, performing one of non-processing, low-pass filtering, and unsharpened masking using a third emphasis coefficient on the concerned pixel; and when the area to which the concerned pixel belongs is determined as the background area in the determination of the area type of the concerned pixel, outputting the concerned pixel as it is.

23. The digital image quality enhancing method of claim 22, wherein the first and second emphasis coefficients are calculated using a mean brightness of pixels in a predetermined window including the concerned pixel.

24. A computer-readable recording medium encoded with computer instructions executable by a computer to perform thereby a method of improving a quality of a document image comprising pixels with a predetermined resolution and obtained by scanning a script comprising a combination of a background, a text, and an image, the method comprising:

updating history information regarding color data and a pixel type of a concerned pixel using previous history information of the concerned pixel;

determining a block feature type of the concerned pixel using the pixel type and the updated history information of the concerned pixel;

determining a type of an area to which the concerned pixel belongs based on a second type of a second area to which a first neighboring pixel in a left direction of the concerned pixel belongs, a third type of a third area to which a second neighboring pixel in a line above the concerned pixel belongs, the pixel type of the concerned pixel, and the determined block feature type; and performing different image quality enhancing processes on the concerned pixel based on the determined area type.

25. A digital image quality improving apparatus to improve a quality of a document image comprising pixels with a predetermined resolution and obtained by scanning a script comprising a combination of a background, a text, and an image, the apparatus comprising:

a history information updating unit that updates history information regarding color data and a pixel type of a concerned pixel using previous history information of the concerned pixel;

a block feature type detecting unit that determines a block feature type of the concerned pixel using the pixel type and updated history information of the concerned pixel;

an area type determining unit that determines a type of an area to which the concerned pixel belongs depending on a type of an area to which a neighboring pixel in a left direction of the concerned pixel belongs, the pixel type of the concerned pixel, a type of an area to which a neighboring pixel in a line above the concerned pixel belongs, and the block feature type of the concerned pixel provided by the block feature type detecting unit; and an image quality enhancing unit that enhances an image quality of the concerned pixel to different degrees according to the area type determined by the area type determining unit.

26. The digital image quality enhancing apparatus of claim 25, further comprising a storing unit that comprises a line memory having a width of 1 bit, and when the block feature type detecting unit detects an image block feature from the concerned pixel, sets a position next to a position from which a background block feature is finally detected in the left direction of the concerned pixel to be 1, and stores the value of 1 in the line memory, wherein the area type determining unit uses the value of the line memory as information to determine the area type.

27. The digital image quality enhancing apparatus of claim 25, wherein the block feature type detecting unit comprises:
   a background block feature detecting unit that classifies the concerned pixel as a pixel having the background block feature with reference to the history information when blocks of first sizes in left and upper directions of the concerned pixel comprise background pixels;
   an image block feature detecting unit that classifies the concerned pixel as a pixel having the image block feature with reference to the history information when blocks of second sizes in the left and upper directions of the concerned pixel comprise image pixels; and
   a halftone block feature detecting unit that classifies the concerned pixel as a pixel having a halftone block feature using the pixel type of the concerned pixel, pixel types of pixels in the left direction of the concerned pixel, and a type of an area to which a neighboring pixel above the concerned pixel belongs.

28. A method of enhancing digital image quality of a document image comprising pixels with a predetermined resolution, the method comprising:
   converting color data of a concerned pixel;
   updating history information according to a pixel type of the concerned pixel;
   determining a block feature type of the concerned pixel;
   determining a type of an area to which the concerned pixel belongs; and
   enhancing image quality of each determined type of area.

29. The method of claim 28, wherein the updating of history information according to the pixel type is performed by using previous history information of the concerned pixel.

30. The method of claim 28, wherein the determining of the block feature type is performed using the type and updated history information of the concerned pixel.

31. The method of claim 28, wherein the determining a type of an area to which the concerned pixel belongs is performed based on a type of an area to which a neighboring pixel in a left direction of the concerned pixel belongs, a type of an area to which a neighboring pixel in a line above the concerned pixel belongs, the pixel type of the concerned pixel, and the determined block feature type.

32. The method of claim 29, wherein the updating of history information comprises low-pass filtering (pre-processing) the concerned pixel according to a magnitude of a bimodality of the concerned pixel.

33. A digital image quality improving apparatus to improve a quality of a document image comprising pixels with a predetermined resolution and obtained by scanning a script comprising a combination of a background, a text, and an image, the apparatus comprising:
   a history information updating unit that updates history information according to a pixel type of a concerned pixel;
   a block feature type detecting unit that determines a block feature type of the concerned pixel;
   an area type determining unit that determines a type of an area to which the concerned pixel belongs; and
   an image quality enhancing unit that enhances an image quality of the concerned pixel to different degrees according to the area type determined by the area type determining unit.

34. The apparatus of claim 33, wherein the history information updating unit updates history information regarding color data and the pixel type of the concerned pixel using previous history information of the concerned pixel.

35. The apparatus of claim 33, wherein the block feature type detecting unit determines the block feature type of the concerned pixel using the pixel type and updated history information of the concerned pixel.

36. The apparatus of claim 33, wherein the area type determining unit determines the type of an area to which the concerned pixel belongs depending on a type of an area to which a neighboring pixel in a left direction of the concerned pixel belongs, the pixel type of the concerned pixel, a type of an area to which a neighboring pixel in a line above the concerned pixel belongs, and the block feature type of the concerned pixel provided by the block feature type detecting unit.

37. The apparatus of claim 33, wherein the image quality enhancing unit enhances the image quality of the concerned pixel to different degrees according to the area type determined by the area type determining unit.

38. The digital image quality enhancing apparatus of claim 33, further comprising a storing unit that comprises a line memory having a width of 1 bit, and when the block feature type detecting unit detects an image block feature from the concerned pixel, sets a position next to a position from which a background block feature is finally detected in the left direction of the concerned pixel to be 1, and stores the value of 1 in the line memory, wherein the area type determining unit uses the value of the line memory as information to determine the area type.

39. The digital image quality enhancing apparatus of claim 33, wherein the block feature type detecting unit comprises:
   a background block feature detecting unit that classifies the concerned pixel as a pixel having the background block feature with reference to the history information when blocks of first sizes in left and upper directions of the concerned pixel comprise background pixels;
   an image block feature detecting unit that classifies the concerned pixel as a pixel having the image block feature with reference to the history information when blocks of second sizes in the left and upper directions of the concerned pixel comprise image pixels; and
   a halftone block feature detecting unit that classifies the concerned pixel as a pixel having a halftone block feature using the pixel type of the concerned pixel, pixel types of pixels in the left direction of the concerned pixel, and a type of an area to which a neighboring pixel above the concerned pixel belongs.

40. A computer-readable recording medium encoded with computer instructions executable by a computer to perform thereby a method of improving a quality of a document image comprising pixels with a predetermined resolution and obtained by scanning a script comprising a combination of a background, a text, and an image, the method comprising:
   converting color data of a concerned pixel;
   updating history information according to a pixel type of the concerned pixel;
   determining a block feature type of the concerned pixel;
   determining a type of an area to which the concerned pixel belongs; and
   enhancing image quality of each determined type of area.

41. A digital image processing apparatus comprising:
a pixel type determining unit to classify a concerned pixel into a first pixel type and a second pixel type;
- a history information updating unit to maintain a first history value of a number of contiguous pixels of the first pixel type and a second history value of a number of contiguous pixels of the second pixel type;
- a block feature determining system to reclassify the concerned pixel according to the first history value and the second history value;
- an area type determining system to determine an image enhancement process to apply to the reclassified concerned pixel; and
- an image enhancement unit to apply the enhancement process to the reclassified concerned pixel.

42. A digital image processing method comprising:
classifying a concerned pixel into a first pixel type and a second pixel type;
updating a first history value if the concerned pixel is of the first pixel type and updating a second history value if the concerned pixel is of the second pixel type;
reclassifying the concerned pixel according to the first history value and the second history value; and
applying an image enhancement process according to a pixel type of the reclassified concerned pixel.

* * * * *